United States Patent
Abdo et al.

(10) Patent No.: US 7,386,564 B2
(45) Date of Patent: Jun. 10, 2008

(54) GENERATING STATISTICS ON TEXT PATTERN MATCHING PREDICATES FOR ACCESS PLANNING

(75) Inventors: Abdo Esmail Abdo, Rochester, MN (US); Travis Michael Drucker, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 10/758,486

(22) Filed: Jan. 15, 2004

(65) Prior Publication Data

US 2005/0160093 A1  Jul. 21, 2005

(51) Int. Cl.
  *G06F 7/00* (2006.01)
  *G06F 17/00* (2006.01)
(52) U.S. Cl. ................. 707/102; 707/6; 707/5
(58) Field of Classification Search ............ 707/6, 707/3, 5
  See application file for complete search history.

(56) References Cited

U.S. PATENT DOCUMENTS 6,785,677 B1 *   8/2004   Fritchman ............... 707/6
2002/0198867 A1 * 12/2002   Lohman et al. .......... 707/3

OTHER PUBLICATIONS

Haas et al. (Non-Patent Literature: "Sampling—Based Selectivity for Joins Using Augmented Frequent Value Statistics", Peter J. Haas, Arun N. Swami, IBM Almaden Research Center, San Jose CA, 1995, IEEE).*
Haas et al. (NPL: "Sampling—Based Selectivity for joins Using Augmented Frequent Value Statistics", Peter J. Haas, Arun N. Swami, IBM Almaden Research Center, San Jose CA, 1995, IEEE).*

* cited by examiner

*Primary Examiner*—Jean M. Corrielus
*Assistant Examiner*—Giovanna Colan
(74) *Attorney, Agent, or Firm*—Wood, Herron & Evans, LLP

(57) ABSTRACT

Statistics for a pattern matching predicate are generated using stored character statistics. A first structure stores, for each of a plurality of character positions, frequently occurring characters in that character position, and a count of the number of occurrences of that character. A second structure stores frequently occurring characters that are subsequent to the frequently occurring characters stored in the first structure, and a probability of occurrence of each frequently occurring subsequent character. To form an estimate of the number of tuples matching a pattern matching predicate, statistics are retrieved for the matching characters in each matching position in the predicate, and then combined to produce the estimate. In the event a statistic is not stored for a desired character, the available statistics are used to make an estimate by accumulating statistics for other characters, and then calculating average frequency of occurrence of characters that do not have stored statistics.

10 Claims, 5 Drawing Sheets

| Char. No. | Character | Count | Look Ahead | Frequency | Look Ahead | Frequency |
|---|---|---|---|---|---|---|
| 1 | A | 4000 | D | 0.4 | B | 0.2 |
|   | E | 2000 | B | 0.4 | F | 0.1 |
|   | I | 1000 | F | 0.1 | B | 0.1 |
|   | B | 1000 | I | 0.25 | C | 0.2 |
|   | D | 1000 | I | 0.5 | C | 0.2 |
| 2 | B | 1500 | A | 0.15 | E | 0.1 |
|   | C | 1500 | E | 0.2 | A | 0.2 |
|   | D | 1500 | E | 0.3 | B | 0.25 |
|   | F | 1500 | A | 0.1 | E | 0.05 |
|   | I | 1500 | B | 0.4 | C | 0.2 |
| 3 | E | 2000 | D | 0.4 | G | 0.2 |
|   | A | 1750 | B | 0.3 | D | 0.15 |
|   | B | 1500 | I | 0.5 | A | 0.4 |
|   | C | 1250 | A | 0.2 | I | 0.2 |
|   | J | 1000 | I | 0.5 | B | 0.2 |
| 4 | I | 3000 | N | 0.15 | L | 0.1 |
|   | D | 1500 | E | 0.2 | A | 0.2 |
|   | G | 1500 | E | 0.3 | I | 0.25 |
|   | A | 1500 | D | 0.1 | H | 0.05 |
|   | B | 1000 | A | 0.4 | E | 0.2 |
| ... | ... | ... | ... | ... | ... | ... |

OWNERS

| Surname | Given Name | City | Make | Model | Year |
|---|---|---|---|---|---|
| ..... | ..... | ..... | ..... | ..... | ..... |
| Johnson | Donald | Chicago | Pontiac | Grand Am | 1993 |
| ..... | ..... | ..... | ..... | ..... | ..... |
| Smith | Beth | Washington | Ford | Escort | 1998 |
| ..... | ..... | ..... | ..... | ..... | ..... |
| Jones | Sue | Detroit | Chrysler | Concorde | 1998 |
| ..... | ..... | ..... | ..... | ..... | ..... |
| Miller | Robert | Kansas City | Chevrolet | Caprice | 2000 |
| ..... | ..... | ..... | ..... | ..... | ..... |
| Nelson | Laura | Dallas | Mercedes | 190E | 1995 |
| ..... | ..... | ..... | ..... | ..... | ..... |
| Brown | Anne | Los Angeles | Toyota | Camry | 1991 |
| ..... | ..... | ..... | ..... | ..... | ..... |
| Smith | Harold | Atlanta | VW | Passat | 1999 |
| ..... | ..... | ..... | ..... | ..... | ..... |
| Unger | Thomas | Boston | Nissan | Sentra | 1989 |
| ..... | ..... | ..... | ..... | ..... | ..... |

FIG. 1

| Surname | Pointer |
|---|---|
| ..... | ..... |
| Brown | 1268 |
| ..... | ..... |
| Johnson | 302 |
| ..... | ..... |
| Jones | 655 |
| ..... | ..... |
| Miller | 901 |
| ..... | ..... |
| Nelson | 721 |
| ..... | ..... |
| Smith | 1496, 51 |
| ..... | ..... |
| Unger | 165 |
| ..... | ..... |

FIG. 2

| Char. No. | Character | Count | Look Ahead | Frequency | Look Ahead | Frequency |
|---|---|---|---|---|---|---|
| 1 | A | 4000 | D | 0.4 | B | 0.2 |
| 1 | E | 2000 | B | 0.4 | F | 0.1 |
| 1 | I | 1000 | F | 0.1 | B | 0.1 |
| 1 | B | 1000 | I | 0.25 | C | 0.2 |
| 1 | D | 1000 | I | 0.5 | C | 0.2 |
| 2 | B | 1500 | A | 0.15 | E | 0.1 |
| 2 | C | 1500 | E | 0.2 | A | 0.2 |
| 2 | D | 1500 | E | 0.3 | B | 0.25 |
| 2 | F | 1500 | A | 0.1 | E | 0.05 |
| 2 | I | 1500 | B | 0.4 | C | 0.2 |
| 3 | E | 2000 | D | 0.4 | G | 0.2 |
| 3 | A | 1750 | B | 0.3 | D | 0.15 |
| 3 | B | 1500 | I | 0.5 | A | 0.4 |
| 3 | C | 1250 | A | 0.2 | I | 0.2 |
| 3 | J | 1000 | I | 0.5 | B | 0.2 |
| 4 | I | 3000 | N | 0.15 | L | 0.1 |
| 4 | D | 1500 | E | 0.2 | A | 0.2 |
| 4 | G | 1500 | E | 0.3 | I | 0.25 |
| 4 | A | 1500 | D | 0.1 | H | 0.05 |
| 4 | B | 1000 | A | 0.4 | E | 0.2 |
| ... | ... | ... | ... | ... | ... | ... |

FIG. 4

GENERATING STATISTICS ON TEXT PATTERN MATCHING PREDICATES FOR ACCESS PLANNING

FIELD OF THE INVENTION

This invention generally relates to a database management system performed by computers.

BACKGROUND OF THE INVENTION

Statistics are frequently accumulated to describe data in a database, to facilitate accesses made to the data. Statistics are typically used by an optimizer to create an access plan for accessing the data. For example, when a query seeks records meeting multiple selection criteria, the optimizer may determine that the results may assembled most efficiently by applying the selection criteria in an appropriate order. Ordering is important because the process of scanning a database for matching records is time consuming.

Among the types of selection criteria usable on database, are pattern matching criteria such as the SQL "LIKE" predicate. To understand the use of this predicate, consider a database table (otherwise known as a relation) named "Owners", including columns (otherwise known as attributes) identifying vehicle owners by name and city, and the make, model, model year and other information about their vehicles. A table of this kind is shown in FIG. 1A of the drawings, which shows just eight selected rows of a much larger relation. It should be noted that the rows of the relation are completely randomly organized on disk with regard to the attributes.

An exemplary query into such a relation may seek rows (otherwise known as tuples) having a surname beginning with "Jo . . . ". This query in SQL could take the form:

SELECT * from Table
WHERE Table.Surname LIKE "Jo . . . "

This query involves finding all rows having a surname that begins with "Jo", which would include at least the rows with "Johnson" and "Jones" of the example of FIG. 1.

Most relational data base systems maintain indexes for their relations. An index is a list stored separately from the relation, and used to select tuples in the relation for access. An index typically is much smaller than the relation, because it usually indexes only one or a few attributes of the relation, so that tuples of interest in the relation can be identified and retrieved without scanning the relation itself. For example, an index for an attribute is shown in FIG. 2; this index includes entries containing each distinct value of the Surname attribute, and a pointer to the location of the tuples having that attribute value in disk storage.

Often, a hash lookup is used to find the index entry that corresponds to a given attribute value, so as to avoid the computationally expensive process of scanning each index entry to find the desired value. Unfortunately, this lookup method is not useable when dealing with pattern matching predicates such as LIKE, since all possible strings matching the pattern matching predicate would need to be passed through the hash function to identify all matching entries in the index, which would be computationally prohibitive in most cases. Thus, in most cases the only way to find the relevant index entries for a search string such as "Jo . . . " would be to review every index entry to determine whether it matches the pattern, or not, which is computationally prohibitive.

Performing access planning without statistics can lead to gross inefficiency. Therefore, there is a need to provide a computationally inexpensive approach to statistically estimating the number of rows of a table that will be returned by a pattern matching predicate.

SUMMARY OF THE INVENTION

In accordance with principles of the present invention, this need is met through the use of a data storage structure storing statistics on an attribute of a relation, comprising a first structure storing, for each of a plurality of character positions, the most frequently occurring characters in that character position.

In specific embodiments, the first structure also stores a count of number of occurrences of the frequently occurring characters. Also, a second structure stores the most frequently occurring characters subsequent to the frequently occurring characters in the first structure, and the probability of the occurrence of the frequently occurring subsequent characters of the second structure.

The invention permits rapid analysis of pattern matching predicates applicable to the attribute that is the subject of the stored data, and generation of statistics reasonably representative of the result of that pattern matching.

The above and other objects and advantages of the present invention shall be made apparent from the accompanying drawings and the description thereof.

BRIEF DESCRIPTION OF THE DRAWING

The accompanying drawings, which are incorporated in and constitute a part of this specification, illustrate embodiments of the invention and, together with a general description of the invention given above, and the detailed description of the embodiments given below, serve to explain the principles of the invention.

FIG. 1 is a diagram of an exemplary relation;

FIG. 2 is a diagram of an index of the relation of FIG. 1 on the owner's surname attribute;

FIG. 4 is a diagram of a data structure utilizing principles of the present invention.

DETAILED DESCRIPTION OF SPECIFIC EMBODIMENTS

Figure 3:
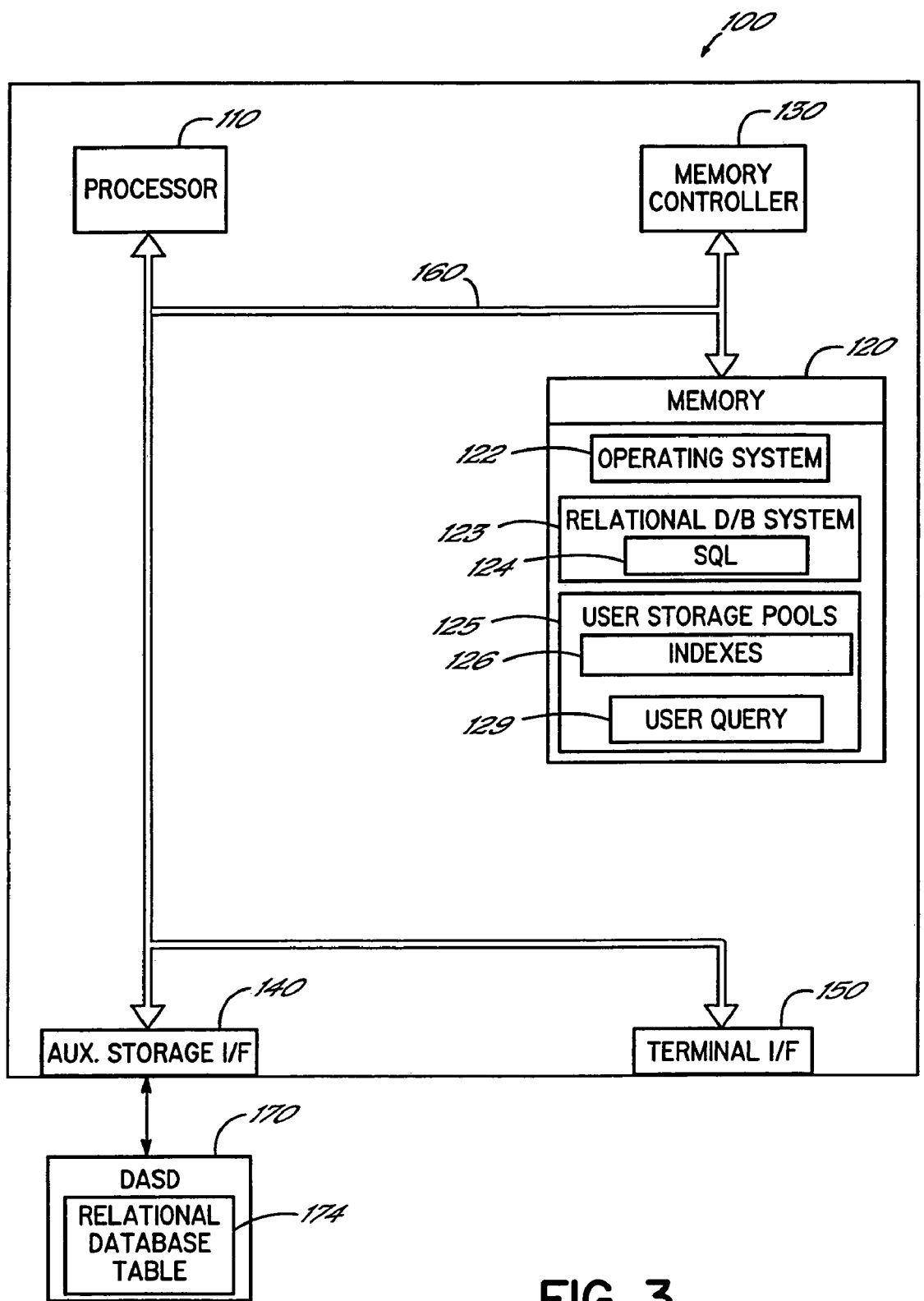
FIG. 3 is a block diagram of a computer system managing a database according to an embodiment of the present invention.

The methods of the present invention employ computer-implemented routines to query information from a database. Referring now to FIG. 3, a block diagram of a computer system which can implement an embodiment of the present invention is shown. The computer system shown in FIG. 3 has a particular configuration; however, those skilled in the art will appreciate that the method and apparatus of the present invention apply equally to any computer system, regardless of whether the computer system is a complicated multi-user computing apparatus or a single user device such as a personal computer or workstation. Thus, computer system 100 can comprise other types of computers such as IBM compatible personal computers running OS/2 or Microsoft's Windows. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 3 within the scope of the present invention such as the addition of cache memory or other peripheral devices. FIG. 3 is presented to simply illustrate some of the salient features of an exemplary computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes a computer program within main memory 120.

Auxiliary storage interface 140 allows computer system 100 to store and retrieve information such as relational database table or relation 174 from auxiliary storage devices, such as magnetic disk (e.g., hard disks or floppy diskettes) or optical storage devices (e.g., CD-ROM). As shown in FIG. 3, one suitable storage device is a direct access storage device (DASD) 170. DASD 170 may alternatively be a floppy disk drive which may read programs and data such as relational database table 174 from a floppy disk. In this application, the term "disk" will be used to collectively refer to all types of storage devices, including disk drives, optical drives, tape drives, etc. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., a floppy disk) and CD ROMS, and transmission type media such as digital and analog communication links, including wireless communication links.

Memory controller 130, through use of a processor is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 3 contains only a single main processor 110 and a single system bus 160, it should be understood that the present invention applies equally to computer systems having multiple buses. Similarly, although the system bus 160 of the embodiment is a typical hardwired, multidrop bus, any connection means that supports-directional communication in a computer-related environment could be used.

In the illustrated embodiment, memory 120 suitably includes an operating system 122, a relational database system 123, and user storage pools 125. Relational database system 123 includes structured query language (SQL) 124, which is an interactive query and report writing interface. Those skilled in the art will realize that SQL 124 could reside independent of relational database system 123, in a separate memory location.

User storage pools 125 include indexes 126 such as that illustrated in FIG. 3, as well as storage for temporary data such as a user query 129. User query 129 is a request for information from relational database table 174 stored in DASD 170. The methods of the present invention do not require that the entire relational database table be loaded into memory 120 to obtain the information requested in user query 129. Instead, indexes are loaded into memory 120 and provide relational database system 123 an efficient way to obtain the information requested by user query 129.

It should be understood that for purposes of this application, memory 120 is used in its broadest sense, and can include Dynamic Random Access Memory (DRAM), Static RAM (SRAM), flash memory, cache memory, etc. Additionally, memory 120 can comprise a portion of a disk drive used as a swap file. While not explicitly shown in FIG. 3, memory 120 may be a single type of memory component or may be composed of many different types of memory components. For example, memory 120 and CPU 110 may be distributed across several different computers that collectively comprise system 100. It should also be understood that programs in memory 120 can include any and all forms of computer programs, including source code, intermediate code, machine code, and any other representation of a computer program.

Users of relational database system 123 provide requests for information in a useful form by creating user query 129. User query 129 is a way to ask relational database system 123 to provide only the set of information from relational database table 174 that meets certain criteria. Structured Query Language (SQL) 124 is the standard command language used to query relational databases. SQL commands are entered by a user to create user query 129, which then typically undergoes the following front-end processing by relational database system 123. User query 129 is parsed for syntax errors. The relational database table from where the user wants his information is identified. The field name(s) associated with the information are verified to exist in the relational database table. And, the SQL commands in user query 129 are reviewed by optimization software in relational database system 123 to determine the most efficient manner in which to process the user's request.

The front-end optimization processing of user query 129 by relational database system 123 determines whether a particular index 127 exists that can facilitate scanning for requested data more efficiently than another database index or than the relational database housed in DASD 170. In order for an index to be useful to the methods of the present invention, the index must be built over the database fields specified by the criteria in user query 129. That is, there must be an index for those particular fields in that particular database.

Referring to FIG. 4, a data structure usable for providing statistics for estimating the results of a pattern matching criterion, can be explained. The example of FIG. 4, for illustration purposes, assumes an alphabet of only ten characters, A-J. The structure stores data for each character position in the attribute data; data for four character positions are shown in FIG. 4.

For each character position, the structure of FIG. 4 identifies the five most frequently occurring characters at that character position in the values of the indexed attribute, and the number of strings in which that character occurs in the identified position. Thus, the letter A occurs in the first position in 4000 values of the indexed attribute, the letter E occurs in the first position in 2000 values of the indexed attribute, and so on. The letter B occurs in the second position in 1500 values of the indexed attribute, the letter E occurs in the third position in 2000 values of the indexed attribute, and so on.

For each frequently occurring character at each position, the following is also stored: the two most frequently occurring subsequent characters, and the frequency with which those characters occur. Thus, the letter D occurs in the second position after the letter A in the first position 40% of the time, whereas the letter B occurs in the second position after the letter A in the first position 20% of the time. The letter B occurs in the second position after the letter E in the first position 40% of the time, whereas the letter F occurs in the second position after the letter E in the first position 10% of the time. Similar data is kept for each starting character position. Thus, the letter A occurs in the third position after the letter B in the second position 15% of the time, and the letter E occurs in the third position after the letter B in the second position 10% of the time; the letter D occurs in the fourth position after the letter E in the third position 40% of the time, and the letter G occurs in the fourth position after the letter E in the third position 20% of the time.

Figure 5:
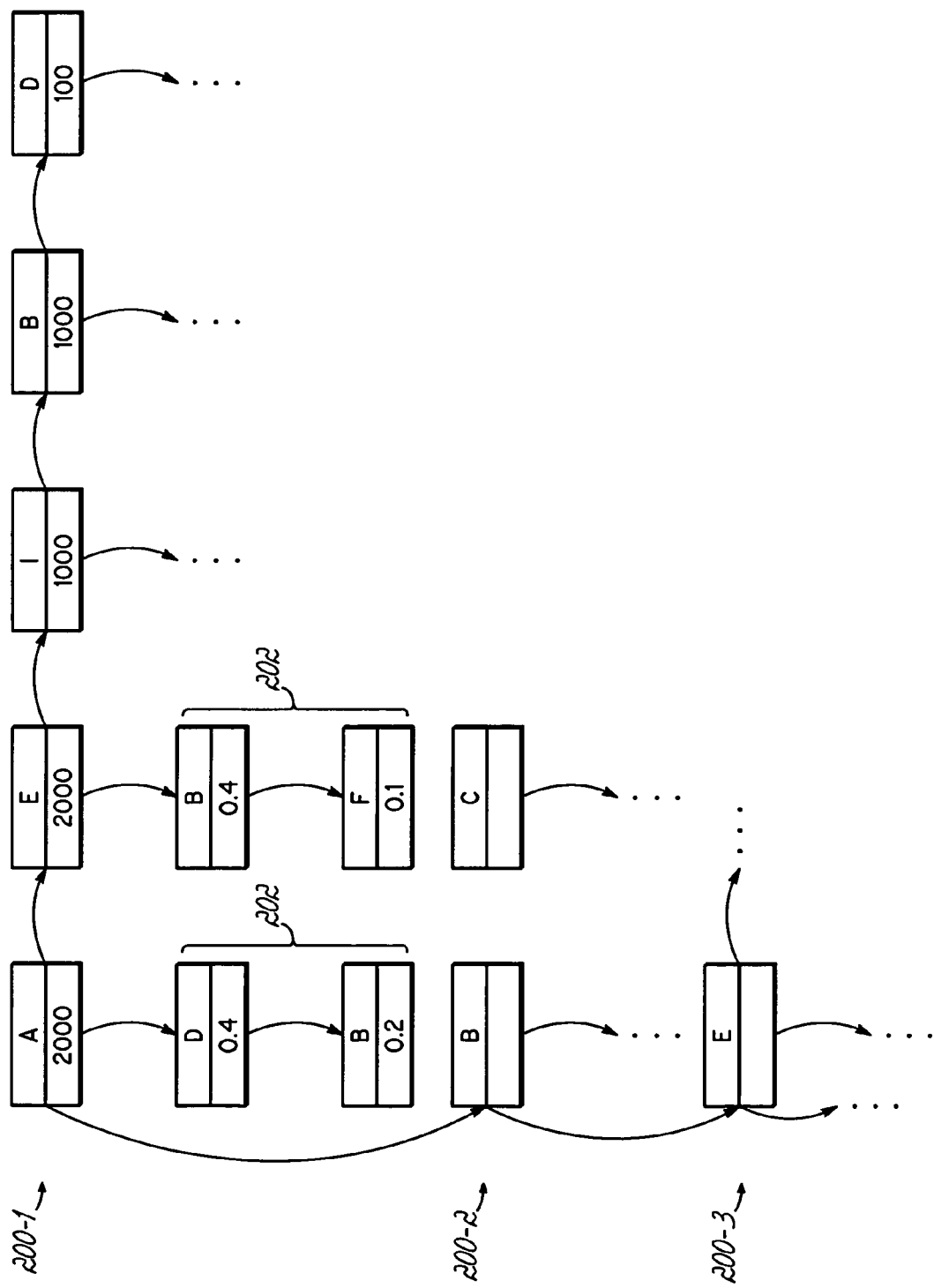
FIG. 5 illustrates a liked list structure for storing frequent characters.

The information presented in tabular form in FIG. 4 may be stored as a table, or as a directed graph/linked list data structure. Referring to FIG. 5, in the latter case, the frequent characters in each position and the counts of each, could be represented by nodes in linked lists 200-1, 200-2, 200-3, etc., each character position having a linked list 200, the head node of which is the most frequent character and the subsequent nodes of which identifying the less frequent characters. Each node in the list 200 further heads a linked list 202 of nodes, each representing the most frequent subsequent characters to the character that heads the list 202.

A linked list structure such as shown in FIG. 5 has the advantage that the number of frequent characters and frequent subsequent characters may be flexibly changed. For example, a linked list structure such as in FIG. 5 could store those characters that occur more than x % of the time in each character position, and for each frequent character, those subsequent characters that occur more than y % of the time; the linked lists would then be larger or smaller as needed to capture the most frequent characters based upon the desired threshold percentages x and y.

Figure 6:
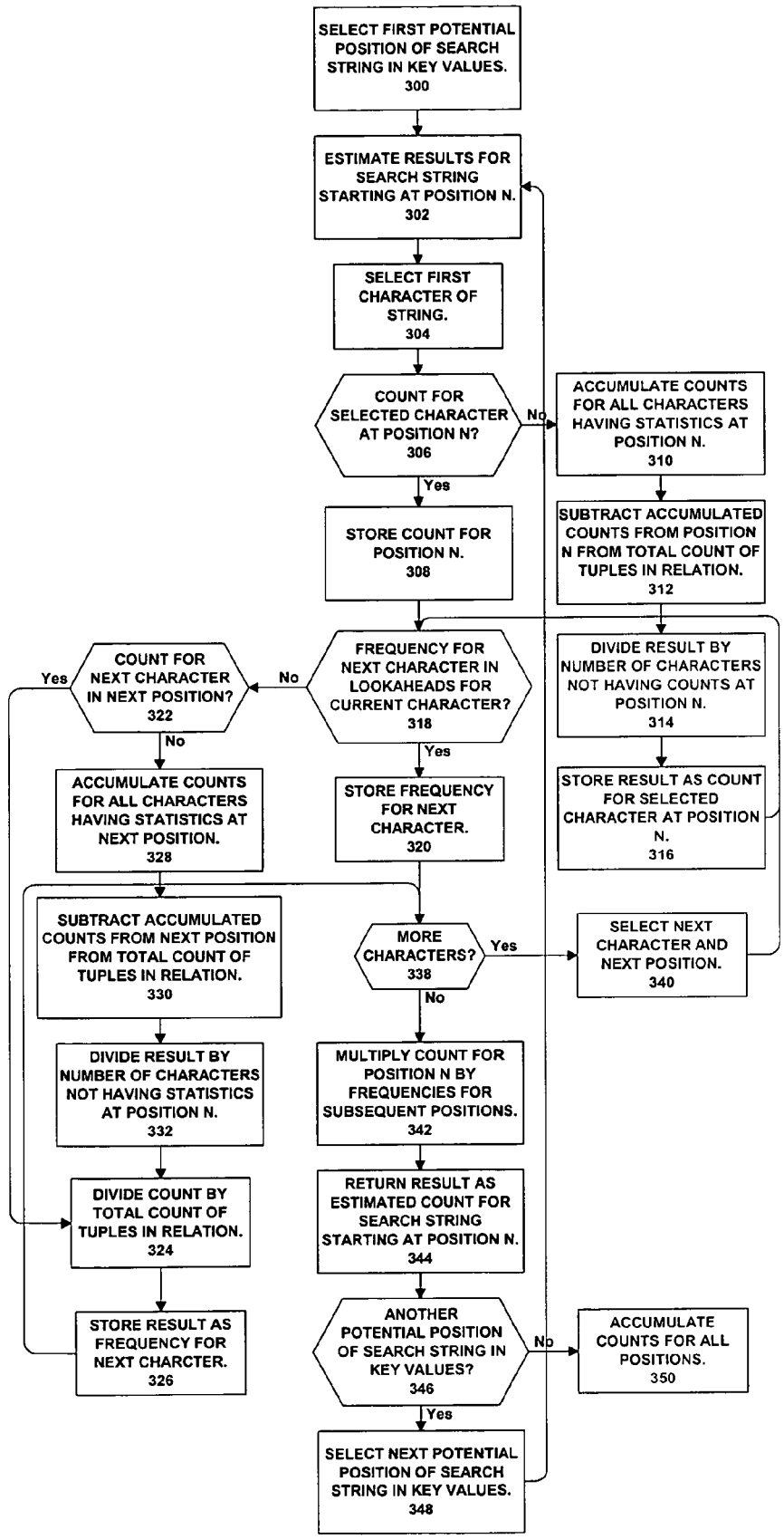
FIG. 6 illustrates a process for identifying the number of result of a search string.

Using this structure, statistics for the likely number of rows matching a pattern matching predicate can be readily generated. For example, referring to FIG. 6, the process for identifying the number of results of a search string starting at position n, can be described. In a first step 300, the first potential position of a search string in the key values of the relevant attribute, is identified. Then, a sequence of steps 302 through 344 is performed to estimate the count of results matching the search string at that position. After these steps, in step 346 it is determine whether there is another potential position of the search string in the key values, and if so, in step 348, that potential position is selected and the steps 302 through 344 are repeated to estimate the count of results matching the search string at that position. After all potential positions of the search string in the key values have been evaluated, the search process is done, and in step 350 the counts at each potential position are accumulated to produce the estimate of the total count of results for the search string.

The process starting at step 302, for estimating the results for the search string at a position N, begins with step 304 in which the first character of the search string is selected, and then in step 306, it is determined whether a count is stored for the selected character, at the desired position N. If so, then in step 308, this count is stored. If not, the count must be estimated. This is done in steps 310-316, by accumulating the counts for all characters that do have statistics at character N (step 310), then subtracting those accumulated counts from the total number of tuples in the relation (step 312). The result represents the number of tuples attributable to characters for which there are no stored counts, and is divided (step 314) by the number of characters for which there are no counts, as an estimate of the number of tuples with the desired character. The result is then stored (step 316) as the estimated count for the selected character at position N.

After finding the count for the first character in the search string, the frequencies for the subsequent characters in the search string are identified, in the sequence of steps 318 through 338, which are repeated for each subsequent character in the search string. In the first of these steps, it is determined whether there is a stored frequency for the next character in the search string, among lookahead frequencies for the current character in the search string. If so, in step 320, that frequency is stored. If not, then the frequency must be estimated, by a process in steps 322-332.

Specifically, in step 322, it is determined whether there is a count for the next character in the search string, in the next position. If so, then in step 324, the count is divided by the total count of tuples in the relation, and the result is stored as the frequency estimate for the next character.

If, in step 322, there is no count for the next character in the search string in the next position, then this count must be estimated. This is done by a process similar to that of steps 310 through 316. Specifically, in step 328, the counts for all characters having counts is accumulated, and in step 330, this accumulated count is subtracted from the total number of tuples in the relation. In step 332, the result is divided by the number of characters that do not have stored counts, to estimate the count for the desired character. Then this estimate is used in step 324 to create an estimated frequency, by dividing the estimated count by the number of tuples in the relation, and then in step 326 the result is stored.

After the above steps, a frequency has been determined for a character in the search string that is subsequent to the current character. In step 338, it is determined whether there are additional characters. If so, then in step 340 the next character in the search string and next position in the stored statistics are selected, to estimate frequencies for the next character.

After frequencies have been estimated for all characters, in step 342, the count identified for position N is multiplied by the frequencies identified for each subsequent position. Then in step 344, the result is returned as an estimate of the count of key values that will match the search string starting at position N.

After step 344, in step 346 it is determined whether there is another potential position in which the search string may match the key values. If so, processing continues to step 348 in which the next potential position is selected, and then returns to step 302 to generate an estimate at the newly identified position.

After counts have been estimated for all potential positions, processing proceeds from step 346 to step 350, in which the estimated counts are accumulated and returned as the results for all positions.

As an example of this process, to determine the number of rows that will match the search string "BIB" anywhere in the string value, first look up "B" in position 1. B occurs 1000 times in position 1 and I is one of the most frequent subsequent characters with a frequency of 25%. From I in position 2, B is found to be a frequent subsequent character, with a frequency of 40%. So the predicted number of occurrences of "BIB" starting at position 1, is 1000*25%*40%=100 occurrences.

Now, to find the number of occurrences of BIB starting at position 2, find "B" in position 2. It occurs 1500 times, but I is not a frequent subsequent character, in fact, "I" is not even a frequently occurring character in position 3. We must then approximate the frequency of I in the third position. Assuming the number of rows in the table is 10,000, it can be observed that the most frequent characters in position 3 represent 7,500 rows. Thus there are 2,500 rows with other characters in position 3. Assuming the other characters occur equally (and based on the 10 character alphabet for this example), we can approximate the other 5 characters, such as I, occur 500 times or 5% of the time in position 3. Next, the frequency of B for position 4 must be estimated. B is a frequent value in position 3, occurring 1000 times out of the 10,000 rows, or 10% of the time. So, the number of occurrences of "BIB" starting at character 2 can be estimated at 1500*5%*10%=7.5 occurrences.

Finally, the number of occurrences of BIB starting at position 3 needs to be calculated. Through the same process, B is found to occur 1500 in position 3, with I following B with a frequency of 50%. B is not a frequent character following I in position 4, so B is looked up in position 5 (not shown in FIG. 4). Assume this shows that B occurs 1,000 out of 10,000 times in position 5, thus giving a frequency of 10%. Now, the prediction for the number of occurrences of BIB starting at position 3 is estimated at 1500*50%*10%=75 occurrences.

If we assume for this example that the longest string in our sample is five characters, we know "BIB" does not occur starting at position 4. Thus, the total estimated number of occurrences of "BIB" in any position is 100+7.5+75=182.5 occurrences.

Analyzing the storage requirement for an index of the type shown, considering the worst case, assume a tabular representation of the index such as FIG. 4, an attribute having up to N characters, and an alphabet of size K. Assume further that the table has M rows. If we provide statistics for each of the K characters in each of the N positions, and statistics for each of the K characters as a subsequent character, then there are K nodes in each row 200-1, each of which heads a list of K nodes 202 storing frequencies for all K look-ahead characters. Thus, the number of nodes for each character position is K*(K+1). There will be (N−1) rows 200-1 of nodes (there would not need to be nodes for position N since the look-aheads for position N−1 can be used to identify frequencies for position N). So, the total number of nodes will be (N−1)*K*(K+1)=K$^2$*(N−1)+K*(N−1). (The nodes likely will have different sizes owing to the different number of pointers in each, but this rough count of the number of nodes is a useful general reference.) Notably, the number of nodes is not a function of the number of rows M.

To provide one example, for a table with 10 million rows, and a text field of maximum 1 kbytes, the size of the data for the text field is potentially 10 gigabytes. A worst case, maximum size index for all 1024 positions in this text field, assuming full indexing of an entire 256 character alphabet, would have 256$^2$*(1023)+256*1023 nodes. Assuming 8 bytes per nodes, the total size would be about 510 megabytes or 5% of the original data size.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, while the examples provided herein have been explained in the context of a database program implementing standard query language (SQL), the invention may be used in the context of a database program using any other declarative database language. The invention relates to implementation of a database program and is not limited to any particular end user language. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method for generating a statistic for a pattern matching predicate on an attribute of a relation, to be used in optimizing execution of a query directed to one or more attributes of said relation, comprising
   providing a relational database including a relation having a plurality of tuples including value for a plurality of attributes;
   providing a data storage structure storing character statistics on said attribute, comprising a first structure storing, for each of a plurality of character positions, frequently occurring characters in that character position, and statistics for each frequently occurring character,
   retrieving said statistics in response to said pattern matching predicate based upon the character positions of characters in said pattern matching predicate, and
   generating said statistic based upon said retrieved character statistics.

2. The method of claim 1 wherein said data storage structure further stores a count of a number of occurrences of a frequently occurring character.

3. The method of claim 1 wherein said data storage structure further comprises a second structure storing frequently occurring characters that are subsequent to the frequently occurring characters stored in said first structure.

4. The method of claim 3 wherein said second data storage structure further stores a probability of occurrence of a frequently occurring subsequent character.

5. The method of claim 1 wherein generating said statistic based upon said retrieved character statistics comprises estimating a statistic for a desired character and desired character position, in the event said statistic is not stored in said first structure.

6. The method of claim 5 wherein said estimating comprises accumulating statistics for said desired character position, for characters other than said desired character, and calculating average frequency of occurrence of characters that do not have statistics stored in said first structure.

7. The method of claim 1 wherein said first structure is a table.

8. The method of claim 1 wherein said first structure comprises a linked list.

9. The method of claim 3 wherein said second structure comprises a table.

10. The method of claim 3 wherein said second structure comprises a linked list.

* * * * *